United States Patent
Zhang et al.

(10) Patent No.: US 9,019,641 B2
(45) Date of Patent: Apr. 28, 2015

(54) SYSTEMS AND METHODS FOR ADAPTIVE THRESHOLD PATTERN DETECTION

(71) Applicant: LSI Corporation, Milpitas, CA (US)

(72) Inventors: Haotian Zhang, Longmont, CO (US); Yu Liao, Longmont, CO (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/714,233

(22) Filed: Dec. 13, 2012

(65) Prior Publication Data

US 2014/0168810 A1 Jun. 19, 2014

(51) Int. Cl.
| | |
|---|---|
| G11B 5/02 | (2006.01) |
| G11B 27/32 | (2006.01) |
| H04B 1/10 | (2006.01) |
| G11B 5/596 | (2006.01) |

(52) U.S. Cl.
CPC ............ *G11B 27/322* (2013.01); *H04B 1/1027* (2013.01); *G11B 5/59616* (2013.01)

(58) Field of Classification Search
CPC .................. G11B 5/02; G11B 5/59616; G11B 20/10231; G11B 2020/1287; G11B 2020/1476; G11B 27/10; H04B 1/1036
USPC .......... 360/77.05, 77.08, 77.09, 78.09, 78.14, 360/246, 39, 55, 48, 53
See application file for complete search history.

(56) References Cited

U.S. PATENT DOCUMENTS

| | | | |
|---|---|---|---|
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,594,341 A | 1/1997 | Majidi-Ahy | |
| 5,668,679 A | 9/1997 | Swearingen et al. | |
| 5,696,639 A | 12/1997 | Spurbeck et al. | |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 13/529,572, filed Jun. 21, 2012, Yang et al.

(Continued)

*Primary Examiner* — Thomas Alunkal (74) *Attorney, Agent, or Firm* — Hamilton DeSanctis & Cha (57) ABSTRACT

The present inventions are related to systems and methods for data processing, and more particularly to systems and methods for detecting patterns in a data stream. In one case, a data processing system is disclosed that includes: a pattern detector circuit operable to generate a pattern value based upon a comparison of a defined pattern to a first portion of a received input; and a comparator circuit operable to compare the pattern value to an adapted threshold, and to selectively assert a pattern found signal based at least in part on the comparison of the pattern value and the adapted threshold, where the adapted threshold is adjusted based at least in part on a noise component of a second portion of the received input.

20 Claims, 7 Drawing Sheets

(56) References Cited

U.S. PATENT DOCUMENTS

| | | |
|---|---|---|
| 5,768,044 A | 6/1998 | Hetzler |
| 5,781,129 A | 7/1998 | Schwartz et al. |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens |
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,269,058 B1 | 7/2001 | Yamanoi et al. |
| 6,278,591 B1 | 8/2001 | Chang |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,476,989 B1 | 11/2002 | Chainer |
| 6,490,110 B2 | 12/2002 | Reed et al. |
| 6,493,162 B1 | 12/2002 | Fredrickson |
| 6,515,812 B1* | 2/2003 | Bergmans et al. ............... 360/48 |
| 6,519,102 B1 | 2/2003 | Smith et al. |
| 6,530,060 B1 | 3/2003 | Vis et al. |
| 6,603,622 B1 | 8/2003 | Christiansen et al. |
| 6,606,048 B1 | 8/2003 | Sutardja |
| 6,611,397 B1* | 8/2003 | Nguyen ..................... 360/77.08 |
| 6,633,447 B2 | 10/2003 | Franck et al. |
| 6,646,822 B1 | 11/2003 | Tuttle et al. |
| 6,657,802 B1* | 12/2003 | Ashley et al. ................... 360/51 |
| 6,671,404 B1 | 12/2003 | Kawatani |
| 6,707,626 B2* | 3/2004 | Esumi ............................. 360/51 |
| 6,711,228 B1 | 3/2004 | Kato et al. |
| 6,717,764 B2 | 4/2004 | Lake |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,865,040 B2 | 3/2005 | Fayeulle et al. |
| 6,876,511 B2 | 4/2005 | Koyanagi |
| 6,906,990 B2 | 6/2005 | Nagata et al. |
| 6,912,099 B2 | 6/2005 | Annampedu et al. |
| 6,963,521 B2 | 11/2005 | Hayashi |
| 6,972,540 B1* | 12/2005 | Wang et al. ............... 318/400.34 |
| 6,980,382 B2 | 12/2005 | Hirano et al. |
| 6,999,257 B2 | 2/2006 | Takeo |
| 6,999,264 B2 | 2/2006 | Ehrlich |
| 6,999,404 B2 | 2/2006 | Furumiya et al. |
| 7,002,767 B2 | 2/2006 | Annampedu et al. |
| 7,016,131 B2 | 3/2006 | Liu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,133,227 B2 | 11/2006 | Chiang |
| 7,136,250 B1 | 11/2006 | Wu et al. |
| 7,154,689 B1 | 12/2006 | Shepherd et al. |
| 7,158,464 B2 | 1/2007 | Gushima et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,203,015 B2 | 4/2007 | Sakai et al. |
| 7,206,146 B2 | 4/2007 | Flynn et al. |
| 7,663,831 B2 | 4/2007 | Sutardja et al. |
| 7,212,364 B1* | 5/2007 | Lee ................................ 360/51 |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,394,608 B2 | 7/2008 | Eleftheriou |
| 7,411,531 B2 | 8/2008 | Aziz et al. |
| 7,420,498 B2 | 9/2008 | Barrenscheen |
| 7,423,827 B2 | 9/2008 | Neville |
| 7,446,690 B2 | 11/2008 | Kao |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,567 B2 | 10/2009 | Park |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 7,643,235 B2 | 1/2010 | Erden et al. |
| 7,656,982 B2 | 2/2010 | Gaedke |
| 7,679,850 B2 | 3/2010 | Smith |
| 7,693,243 B2 | 4/2010 | Chen et al. |
| 7,738,200 B2 | 6/2010 | Annampedu |
| 7,768,437 B2 | 8/2010 | Annampedu |
| 7,768,730 B2 | 8/2010 | Bliss et al. |
| 7,796,480 B2 | 9/2010 | Cheng et al. |
| 7,813,065 B2 | 10/2010 | Annampedu |
| 7,821,730 B2 | 10/2010 | Cao |
| 7,835,104 B2 | 11/2010 | Yamashita |
| 7,889,823 B2 | 2/2011 | Yang |
| 7,929,237 B2 | 4/2011 | Grundvig |
| 8,014,099 B2 | 9/2011 | Mathew |
| 8,054,573 B2 | 11/2011 | Mathew |
| 8,054,931 B2 | 11/2011 | Annampedu |
| 8,059,349 B2 | 11/2011 | Annampedu |
| 8,098,451 B2 | 1/2012 | Graef |
| 8,102,960 B2 | 1/2012 | Ran et al. |
| 8,107,573 B2 | 1/2012 | Chang |
| 8,154,818 B2 | 4/2012 | Mathew |
| 8,154,972 B2 | 4/2012 | Ratnakar Aravind |
| 8,169,726 B2 | 5/2012 | Wilson |
| 8,174,784 B2 | 5/2012 | Grundvig |
| 8,174,949 B2 | 5/2012 | Ratnakar Aravind |
| 8,237,597 B2 | 8/2012 | Liu |
| 8,243,381 B2 | 8/2012 | Annampedu |
| 8,254,049 B2 | 8/2012 | Annampedu |
| 8,261,171 B2 | 9/2012 | Annampedu |
| 2002/0061087 A1 | 5/2002 | Williams |
| 2002/0150179 A1 | 10/2002 | Leis et al. |
| 2003/0002189 A1* | 1/2003 | Ozdemir ........................ 360/51 |
| 2003/0048562 A1* | 3/2003 | Heydari et al. ................. 360/51 |
| 2005/0243455 A1 | 11/2005 | Annampedu |
| 2007/0104300 A1 | 5/2007 | Esumi et al. |
| 2007/0127606 A1* | 6/2007 | Ueng et al. ..................... 375/343 |
| 2007/0285817 A1* | 12/2007 | Lau ................................ 360/39 |
| 2008/0056403 A1 | 3/2008 | Wilson |
| 2009/0142620 A1 | 6/2009 | Yamamoto et al. |
| 2009/0274247 A1 | 11/2009 | Galbraith et al. |
| 2010/0061490 A1 | 3/2010 | Noeldner |
| 2010/0067628 A1 | 3/2010 | Buehner |
| 2010/0142078 A1 | 6/2010 | Annampedu |
| 2011/0043938 A1 | 2/2011 | Mathew |
| 2011/0157737 A1 | 6/2011 | Grundvig |
| 2011/0209026 A1 | 8/2011 | Xia |
| 2012/0036173 A1 | 2/2012 | Annampedu |
| 2012/0084336 A1 | 4/2012 | Yang |
| 2012/0087035 A1 | 4/2012 | Graef |
| 2012/0106607 A1 | 5/2012 | Miladinovic |
| 2012/0120784 A1 | 5/2012 | Yang |

(56) References Cited

U.S. PATENT DOCUMENTS

| | | |
|---|---|---|
| 2012/0124241 A1 | 5/2012 | Yang |
| 2012/0134042 A1 | 5/2012 | Annampedu |
| 2012/0134043 A1 | 5/2012 | Annampedu |
| 2012/0155587 A1 | 6/2012 | Annampedu |
| 2012/0182643 A1 | 7/2012 | Zhang |
| 2012/0236428 A1 | 9/2012 | Xia |

OTHER PUBLICATIONS

Annampedu, V. et al fiAdaptive Algorithms for Asynchronous Detection of Coded Servo Signals Based on Interpolationfl, IEEE Transactions on Magnetics, vol. 41, No. 10, Oct. 2005.

Aziz and Annampedu, fiInterpolation Based Maximum-Likelihood(ML) Detection of Asynchronous Servo Repeatable Run Out (RRO) Datafl, Digest, IEEE Intl Magnetics Conf., vol. 42, N.

Aziz and Annampedu, fiAsynchronous Maximum Likelihood (ML) Detection of Servo repeatable Run Out (RRO) Datafl Magnetics Conf. IEEE InternationalMay 2006.

J. Hagenauer and P. Hoeher, fiA Viterbi algorithm with soft-decision outputs and its applications,fl in Proc. IEEE Global Telecommunications Conference 1989, Dallas, Texas, No.

Kryder, M. et al "Heat Assisted Magnetic Recording" Proc. IEEE, vol. 96, No. 11, p. 1810, Nov. 2008.

Polikar, Robi "Ensemble Based Systems in Decision Making" IEEE Circuits and Systems Magazine Third qtr 2006, p. 21-47.

U.S. Appl. No. 13/685,990, Unpublished (filed Nov. 27, 2012) (Haitao Xia).

U.S. Appl. No. 13/529,572, Unpublished (filed Jun. 21, 2012) (Shaohua Yang).

U.S. Appl. No. 13/316,899, Unpublished (filed Dec. 12, 2011) (Haitao Xia).

U.S. Appl. No. 13/242,983, Unpublished (filed Sep. 23, 2011) (Jeffrey P. Grundvig).

U.S. Appl. No. 13/173,088, Unpublished (filed Jun. 30, 2011) (Jeffrey P. Grundvig).

U.S. Appl. No. 13/100,021, Unpublished (filed May 3, 2011) (Haitao Xia).

U.S. Appl. No. 13/096,873, Unpublished (filed Apr. 28, 2011) (Ross S. Wilson).

U.S. Appl. No. 13/186,267, Unpublished (filed Jul. 19, 2011) (Haitao Xia).

Weller et al "Thermal Limits in Ultrahigh-density Magnetic Recording" IEEE Trans. Magn. vol. 35, No. 6, p. 4423, Nov. 1999.

* cited by examiner

SYSTEMS AND METHODS FOR ADAPTIVE THRESHOLD PATTERN DETECTION

FIELD OF THE INVENTION

The present inventions are related to systems and methods for data processing, and more particularly to systems and methods for detecting patterns in a data stream.

BACKGROUND OF THE INVENTION

Various circuits have been developed that provide for identifying synchronization marks within a data stream. As an example, a synchronization mark is identified based upon a threshold comparison. Such a threshold comparison approach depends highly upon determining an appropriate threshold for comparison. Where the selected threshold is too high, sync marks will be missed. Alternatively, where the selected threshold is too low, sync marks may be incorrectly identified. Either case is problematic for proper data processing.

Hence, for at least the aforementioned reasons, there exists a need in the art for advanced systems and methods for sync mark identification.

BRIEF SUMMARY OF THE INVENTION

The present inventions are related to systems and methods for data processing, and more particularly to systems and methods for detecting patterns in a data stream.

Various embodiments of the present invention provide data processing systems that include: a pattern detector circuit, and a comparator circuit. The pattern detector circuit is operable to generate a pattern value based upon a comparison of a defined pattern to a first portion of a received input. The comparator circuit is operable to compare the pattern value to an adapted threshold, and to selectively assert a pattern found signal based at least in part on the comparison of the pattern value and the adapted threshold. The adapted threshold is adjusted based at least in part on a noise component of a second portion of the received input.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 2b graphically shows comparisons yielding the various outputs of a sync mark pattern match calculation circuit included in the ratio metric based sync mark detector circuit of FIG. 2a;

DETAILED DESCRIPTION OF THE INVENTION

The present inventions are related to systems and methods for data processing, and more particularly to systems and methods for detecting patterns in a data stream.

Various embodiments of the present invention provide for pattern detection using an adaptive threshold. In some cases, the adaptive threshold varies as a function of the signal to noise ratio in a stream of input data containing the pattern to be detected. As an example, in one particular embodiment of the present invention, a series of data samples are received that include a pattern to be detected. During a training period, a default threshold is calculated. This may be done, for example, by averaging the best match level of the series of data samples with the second best match level. The best match and the second best match correspond to matches to the pattern in the received series of data samples. In addition, an average energy resulting from other than a periodic pattern (e.g., a preamble patter preceding a sync mark pattern) is repeatedly calculated during the test period to yield an average non-periodic energy. This average non-periodic energy is subtracted from the default threshold to yield a offset value. Then, during normal operation, the best match of the series of data samples to the sync mark pattern is identified and the corresponding value calculated. In addition, the energy resulting from other than the periodic pattern is calculated to yield an instant non-periodic energy. This instant non-periodic energy is added to the offset value to yield an adapted threshold. The value of the best match of the sync mark pattern is compared with the adapted threshold. Where the value is less than the adapted threshold, a sync mark is identified as found. Otherwise, a sync mark is not found. As the non-periodic energy corresponds to the signal to noise ratio in the received series of data samples, the adaptive threshold varies as a function of the instant signal to noise ratio in the received series of digital samples.

Figure 1:
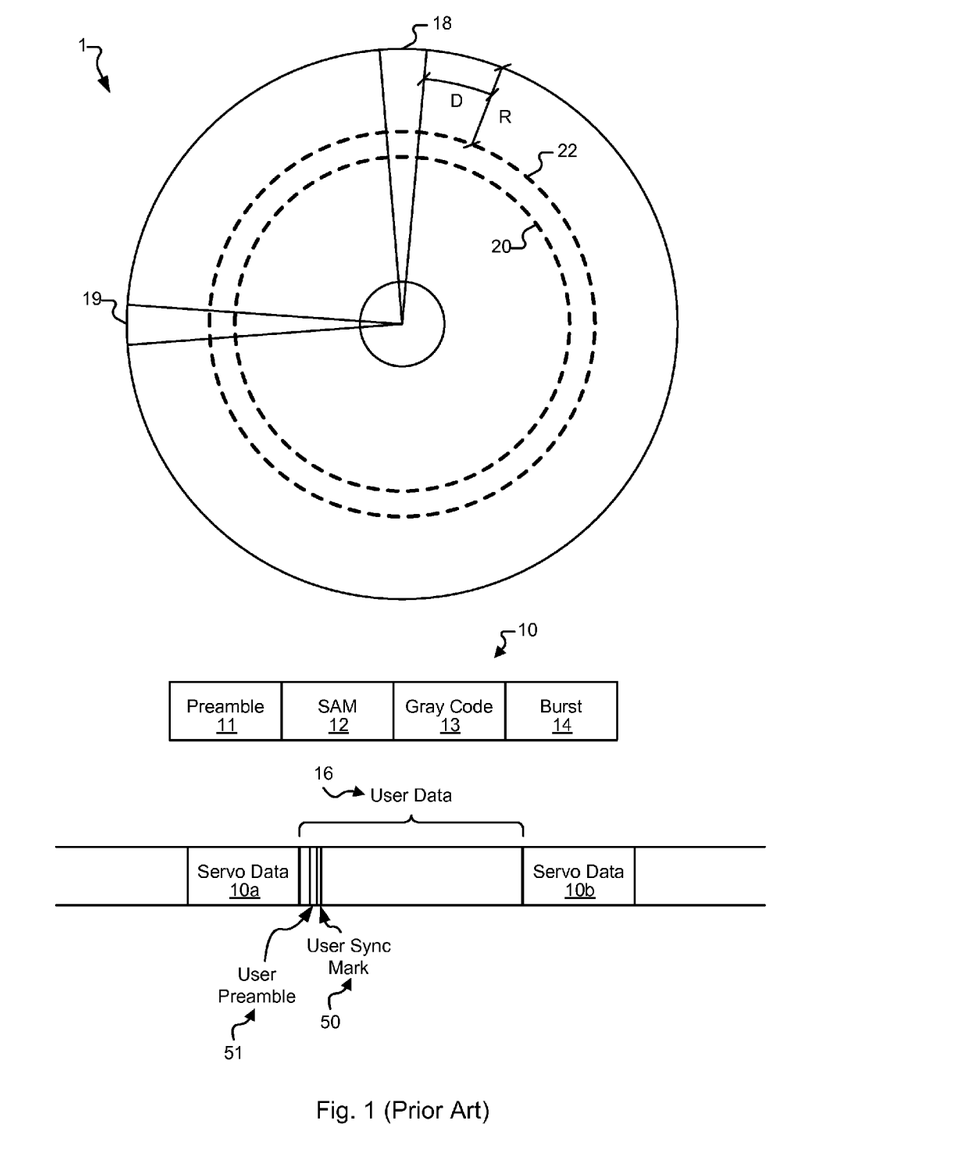
FIG. 1 is a block diagram of a known magnetic storage medium and sector data scheme consistent with existing art.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, the servo data generally includes a preamble pattern 11 followed by a servo address mark 12 (SAM). Servo address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 may include one or more sets of data that are stored to storage medium 1. The data sets may include user synchronization information some of which may be used as a mark to establish a point of reference from which processing of the data within user data region 16 may begin processing.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18. Once the user data region is reached, a user sync mark 50 is detected and used as a reference point from which data processing is performed. User sync mark 50 is preceded by a user preamble 51.

As used herein, the phrase "sync mark" is used in its broadest sense to mean any pattern that may be used to establish a point of reference. Thus, for example, a sync mark may be user sync mark 50 as is known in the art, or one or more portions of servo data bit patterns 10. Based upon the disclosure provided herein, one of ordinary skill in the art may recognize other sync marks that could be used in relation to different embodiments of the present invention.

Various embodiments of the present invention provide data processing systems that include: a pattern detector circuit, and a comparator circuit. The pattern detector circuit is operable to generate a pattern value based upon a comparison of a defined pattern to a first portion of a received input. The comparator circuit is operable to compare the pattern value to an adapted threshold, and to selectively assert a pattern found signal based at least in part on the comparison of the pattern value and the adapted threshold. The adapted threshold is adjusted based at least in part on a noise component of a second portion of the received input. In some cases, the systems are implemented as part of an integrated circuit.

In various embodiments of the present invention, the first portion of the received input is exclusive of the second portion of the received input. In one or more instances of the aforementioned embodiments, the first portion of the received input includes a sync mark, and the second portion of the received input includes a periodic pattern. The periodic pattern may be for example, a 2T preamble pattern. In some instances of the aforementioned embodiments, the data processing system is implemented as part of a storage device, and the received input is derived from a storage medium included in the storage device. In other instances of the aforementioned embodiments, the data processing system is implemented as part of a communication device, and the received input is derived from a transfer medium.

In one or more instances of the aforementioned embodiments, the data processing system further includes a threshold adaptation circuit operable to adjust the adapted threshold based at least in part on the second portion of the received input. In some cases, the threshold adaptation circuit is operable to calculate a noise component of the second portion of the received input, and to add the noise component to an offset value to yield the adapted threshold. In various cases, the threshold adaptation circuit includes a noise calculation circuit operable to calculate a noise component of the second portion of the received input, and a summation circuit operable to add the noise component to an offset value to yield the adapted threshold. In one particular case, the threshold adaptation circuit further includes: a pattern matching circuit operable to compare a defined periodic pattern with the second portion of the received input to yield a first best match value and a second best match value; an averaging circuit operable to average the first best match value and the second best match value to yield an interim value, to calculate a first running average of multiple interim values generated from multiple instances of the second portion of the received input, and to provide the first running average as a trained output; a noise averaging circuit operable to calculate a second running average of the noise components generated from multiple instances of the second portion of the received input, and to provide the second running average as an average noise component; and a summation circuit operable to subtract the average noise component from the trained output to yield the offset value. In various cases, the noise calculation circuit includes: a finite impulse response filter operable to filter the second portion of the received input to yield a filtered output; and a sum of squares circuit operable to sum the squares of elements of the filtered output to yield the noise component.

Other embodiments of the present invention provide methods for detecting a data pattern. The methods include: receiving an input data set; comparing the input data set with a defined pattern to yield a pattern value using a pattern comparison circuit; comparing the pattern value to an adapted threshold; and selectively asserting a pattern found signal based at least in part on the comparison of the pattern value and the adapted threshold. The adapted threshold is adjusted based at least in part on a noise component of a second portion of the received input. In some instances of the aforementioned embodiments, the methods further include: calculating a noise component of the second portion of the received input; and adding the noise component and an offset value to yield the adapted threshold. In some cases, the methods further include: comparing a defined periodic pattern with the second portion of the received input to yield a first best match value and a second best match value; averaging the first best match value and the second best match value to yield an interim value; calculating a first running average of multiple interim values generated from multiple instances of the second portion of the received input where the first running average is provided as a trained output; calculating a second running average of the noise components generated from multiple instances of the second portion of the received input, where the second running average is provided as an average noise component; and subtracting the average noise component from the trained output to yield the offset value. In one or more instances of the aforementioned embodiments, calculating a noise component includes: applying an finite impulse response filtering to the second portion of the received input to yield a filtered output; and summing the squares of elements of the filtered output to yield the noise component.

Figure 2A:
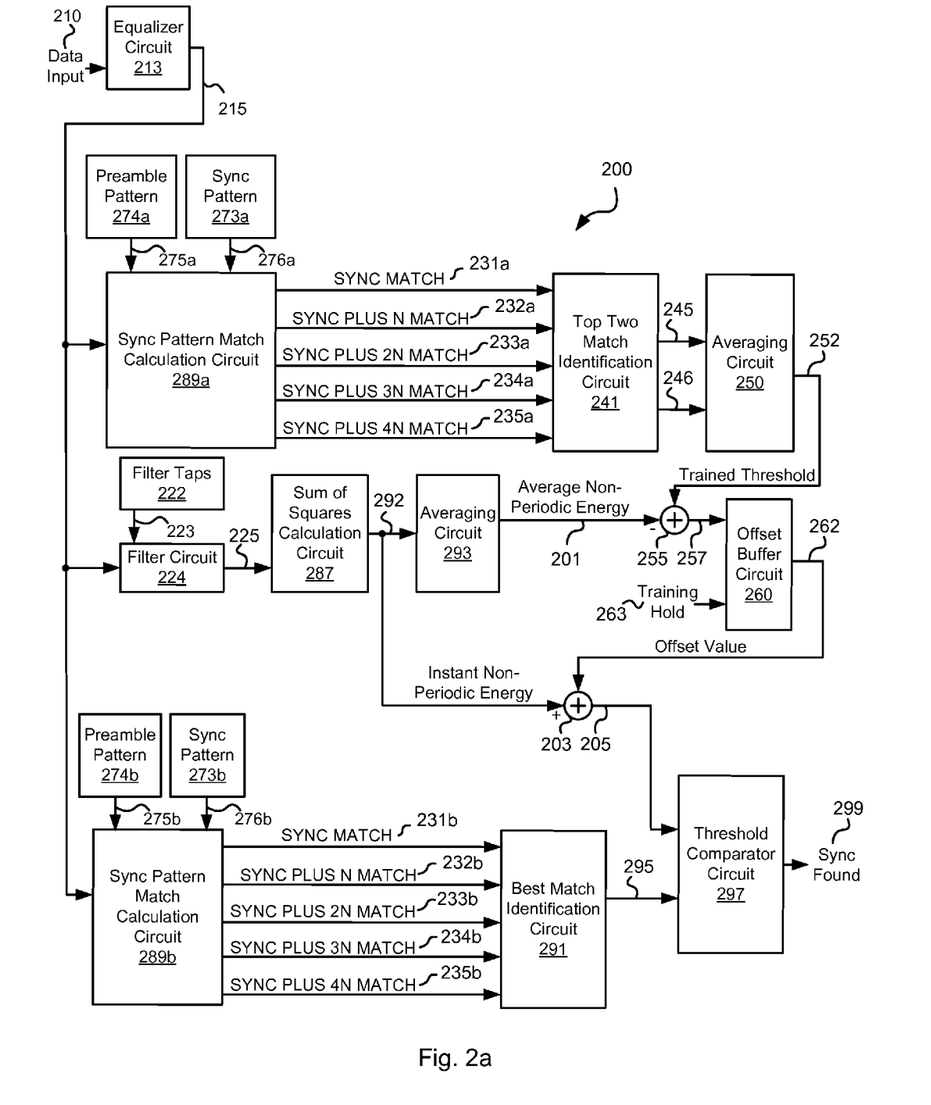
FIG. 2a depicts a sync mark detector circuit using an adaptive threshold in accordance with one or more embodiments of the present invention.

Turning to FIG. 2a, an adaptive threshold sync mark detector circuit 200 is shown in accordance with one or more embodiments of the present invention. Adaptive threshold sync mark detector circuit 200 includes an equalizer circuit 213 that receives a data input 210 and provides an equalized output 215. In some embodiments, equalizer circuit 213 is a digital finite impulse response filter as are known in the art. Data input 210 may be a series of digital samples. The digital samples may represent, for example, data stored on a storage medium or data received via a wireless communication medium. Based upon the disclosure provided herein, one of ordinary skill in the art will recognize a variety of sources of data input 210.

Equalizer output 215 is provided to a sync pattern match calculation circuit 289a. Sync pattern match calculation circuit 289a compares equalizer output 215 with different successive combinations of the periodic pattern 275a and subsequent portions of a sync mark pattern 274a. Sync mark pattern 274a is received from a sync pattern 273a. Sync pattern 273a may be hardwired or user programmable depending upon the particular implementation. Preamble pattern 275a is received from a preamble pattern 274a that may be hardwired or user programmable. In some embodiments of the present invention, preamble pattern 274a is a defined four bit pattern ('1100' or '0011') referred to as a 2T pattern as it repeats every two periods (i.e., T). Based upon the disclosure provided herein, one of ordinary skill in the art will recognize a variety of other periodic patterns that may be used in relation to different embodiments of the present invention. In some embodiments of the present invention, the preamble is twenty bits long. This may be, for example, created as five repetitions of a four bit 2T pattern (i.e., '00110011001100110011').

Figure 2B:
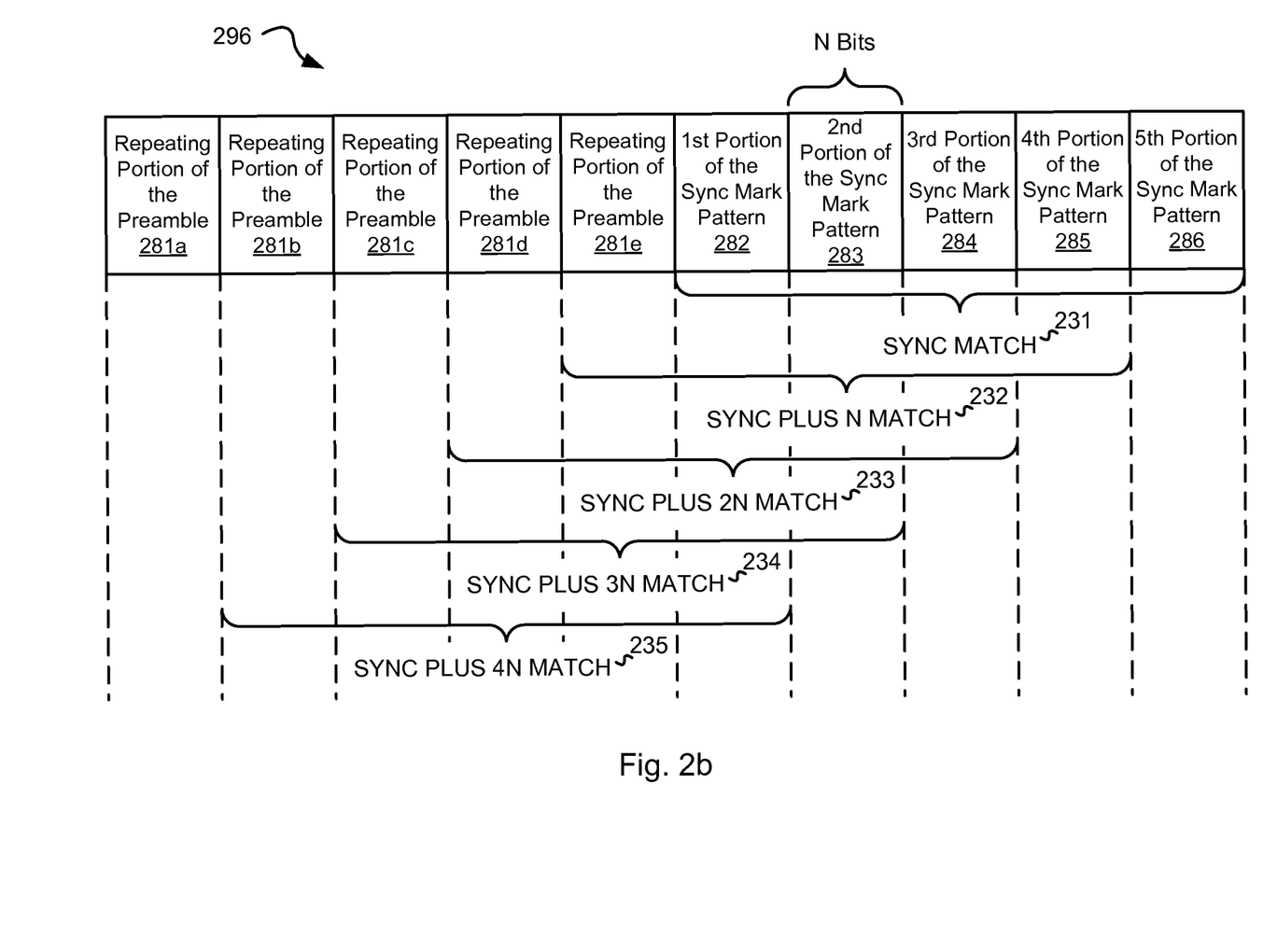

FIG. 2b graphically shows comparisons yielding the various outputs of a sync pattern match calculation circuit 289a that were described above. In particular, a time line 296 shows N-bit preamble pattern 275 repeated a number of times (i.e., elements 281a, 281b, 281c, 281d, 281e) and a number of different N-bit portions (i.e., elements 282, 283, 284, 285, 286) of sync mark pattern 276 lined up in time as they would be expected to be received as part of an incoming data stream. As shown, sync match output 231 corresponds to a comparison (e.g., a Euclidean difference) between equalizer output 215 and the five consecutive N-bit portions 282, 283, 284, 285, 286 of sync mark pattern 276. Sync plus N match output 232 corresponds to a comparison (e.g., a Euclidean difference) between equalizer output 215 and one N-bit portion of the preamble 281e appended with the four least recent N-bit portions 282, 283, 284, 285 of sync mark pattern 276. Sync plus 2N match output 233 corresponds to a comparison (e.g., a Euclidean difference) between equalizer output 215 and two N-bit portions of the preamble 281d, 281e appended with the three least recent N-bit portions 282, 283, 284 of sync mark pattern 276. Sync plus 3N match output 234 corresponds to a comparison (e.g., a Euclidean difference) between equalizer output 215 and three N-bit portions of the preamble 281c, 281d, 281e appended with the two least recent N-bit portions 282, 283 of sync mark pattern 276. Sync plus 4N match output 235 corresponds to a comparison (e.g., a Euclidean difference) between equalizer output 215 and four N-bit portions of the preamble 281b, 281c, 281d, 281e appended with the least recent N-bit portion 282 of sync mark pattern 276.

Each of sync match 231a, sync plus N match 232a, sync plus 2N match 233a, sync plus 3N match 234a, sync plus 4N match 235a are provided to a top two match identification circuit 241 that selects a best match 245 and a second best match 246 to be provided to an averaging circuit 250. Best match 245 is selected by top two match identification circuit 241 to be the value of the one of sync match 231a, sync plus N match 232a, sync plus 2N match 233a, sync plus 3N match 234a, sync plus 4N match 235a that exhibits the lowest value. Second best match 246 is selected by top two match identification circuit 241 to be the value of the one of sync match 231a, sync plus N match 232a, sync plus 2N match 233a, sync plus 3N match 234a, sync plus 4N match 235a that exhibits the second lowest value. Averaging circuit 250 averages the current best match 245 with the current second best match 246 to yield an interim average value, and maintains a running average of the interim average values over a number of instances of periodic patterns. The resulting running average is provided as a trained threshold 252.

In addition, non-periodic energy associated with the periodic pattern (i.e., noise) is calculated. This is done by filtering equalized output 215 over the period corresponding to the periodic pattern using a filter circuit 224. Filter circuit 224 may be, for example, a finite impulse response filter that operates based on taps 223 provided from a filter taps register 222. Taps 223 may be programmable or fixed depending upon the particular implementation. In one particular embodiment where the periodic pattern is a 2T pattern, five taps (i.e., 1, 0, 0, 0, −1) are uses as taps 223. Based upon the disclosure provided herein, one of ordinary skill in the art will recognize other filters that may be used to generate a value corresponding to the non-periodic energy or noise in the periodic pattern.

Filter circuit 224 provides a filtered output 225 to a sum of squares calculation circuit 287 that sums the squares of all the values of filtered output 225 within a window of time surrounding the periodic pattern to yield an instant non-periodic energy 292 representing the noise energy for the currently processing periodic pattern. Of note, this noise energy corresponds to the signal to noise ratio of the periodic pattern (i.e., the signal to noise ratio decreases when the noise energy increases, and increases when the noise energy decreases).

Instant non-periodic energy 292 is provided to an averaging circuit 293 that maintains a running average of the instant non-periodic energy 292 values over the same number of instances of periodic patterns used to yield trained threshold 252. The resulting running average is provided as an average non-periodic energy 201. Average non-periodic energy 201 is provided to a summation circuit 255 where it is subtracted from trained threshold 252 to yield an offset value 257. Offset value 257 is updated over a training period, and at the end of the training period is stored to an offset buffer circuit 260 as indicated by a training hold input 263. Offset value 257 is provided as offset value 262 from offset buffer circuit 260. Training hold input 263 is de-asserted during the training period when periodic patterns are repeatedly processed. In some embodiments of the present invention, offset value 262 is generated based upon processing a thousand or more instances of the periodic pattern. Based upon the disclosure provided herein, one of ordinary skill in the art will recognize a variety of numbers of instances of the periodic pattern that may be processed to yield offset value 262.

The training process (i.e., repeatedly processing periodic data) may be performed under different conditions to yield different values of offset value 262 corresponding to the different conditions. For example, where the sync mark data is being derived from a storage medium, different values for offset value 262 may be used for different zones on the storage medium. The particular value of offset value may then be selected depending upon the condition during standard processing.

During standard processing (i.e., non-training mode), equalizer output 215 is processed by a sync pattern match calculation circuit 284b. Sync pattern match calculation circuit 284b is identical to pattern match calculation circuit 284a. In some embodiments of the present invention, pattern match calculation circuit 284a and pattern match calculation circuit 284a are implemented as the same circuit providing the functionality of pattern match calculation circuit 284a during a training mode and the functionality of pattern match calculation circuit 284b during a standard mode. Sync match 231b, sync plus N match 232b, sync plus 2N match 233b, sync plus 3N match 234b, sync plus 4N match 235b are provided to a best match identification circuit 291 that provides the lowest value of sync match 231b, sync plus N match 232b, sync plus 2N match 233b, sync plus 3N match 234b, or sync plus 4N match 235b as a best sync output 295. Best sync output 295 is provided to a threshold comparator circuit 297.

Also during standard processing, instant non-periodic energy 292 for the periodic pattern in the currently processing equalized output 215 is provided to a summation circuit 203 where it is added to offset value 262 that was generated during the training mode and stored to offset buffer circuit 260. The output of summation circuit 205 is an adaptive threshold value 205. Of note, instant non-periodic energy 292 corresponds to the signal to noise ratio of the currently processing periodic pattern (i.e., the signal to noise ratio decreases when instant non-periodic energy 292 increases, and increases when instant non-periodic energy 292 decreases). Adaptive threshold value 205 is provided to threshold comparator circuit 297 where it is compared to best sync output 295. Where best sync output 295 is less than adaptive threshold value 205, a sync found 299 is asserted.

Figure 3:
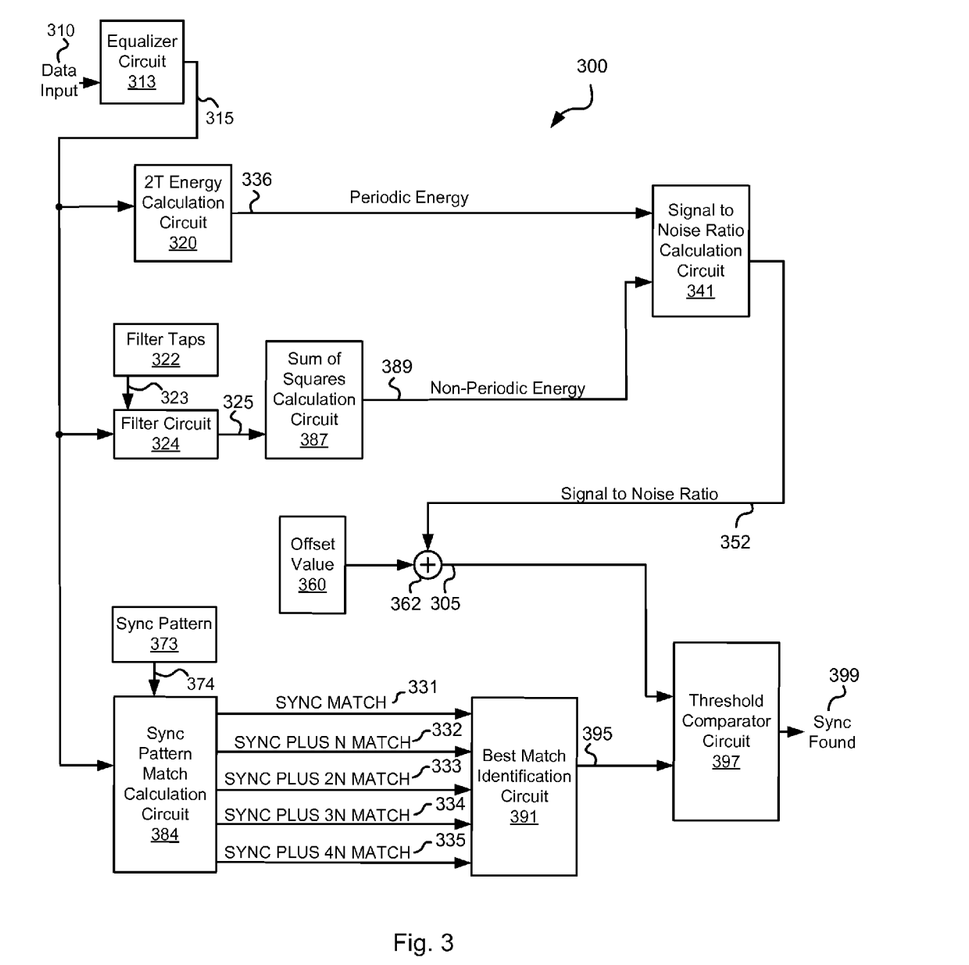
FIG. 3 depicts another sync mark detector circuit using an adaptive threshold in accordance with one or more embodiments of the present invention.

Turning to FIG. 3, another adaptive threshold sync mark detector circuit 300 in accordance with other embodiments of the present invention. Adaptive threshold sync mark detector circuit 300 includes an equalizer circuit 313 that receives a data input 310 and provides an equalized output 315. In some embodiments, equalizer circuit 313 is a digital finite impulse response filter as are known in the art. Data input 310 may be a series of digital samples. The digital samples may represent, for example, data stored on a storage medium or data received via a wireless communication medium. Based upon the disclosure provided herein, one of ordinary skill in the art will recognize a variety of sources of data input 310.

Equalizer output 315 is provided to a periodic energy calculation circuit 320. Periodic energy calculation circuit 320 may be any circuit known in the art that approximates the energy associated with a periodic signal. As one example, periodic energy calculation circuit 320 may calculate sine and cosine components of each sample of equalizer output 315 corresponding to the periodic sample and then perform a sum of squares of the sine and cosine components to yield an interim energy. This interim energy value is then divided by the number of samples to yield a periodic energy 336 (i.e., signal energy associated with the periodic signal). Periodic energy 336 is provided to a signal to noise calculation circuit 341. Based upon the disclosure provided herein, one of ordinary skill in the art will recognize other approaches and circuits that may be used to generate a value corresponding to the periodic energy or signal in the periodic pattern.

In addition, non-periodic energy associated with the periodic pattern (i.e., noise) is calculated. This is done by filtering equalized output 315 over the period corresponding to the periodic pattern using a filter circuit 324. Filter circuit 324 may be, for example, a finite impulse response filter that operates based on taps 323 provided from a filter taps register 322. Taps 323 may be programmable or fixed depending upon the particular implementation. In one particular embodiment where the periodic pattern is a 2T pattern, five taps (i.e., 1, 0, 0, 0, −1) are uses as taps 323. Based upon the disclosure provided herein, one of ordinary skill in the art will recognize other filters that may be used to generate a value corresponding to the non-periodic energy or noise in the periodic pattern.

Filter circuit 324 provides a filtered output 325 to a sum of squares calculation circuit 387 that sums the squares of all the values of filtered output 325 within a window of time surrounding the periodic pattern to yield a non-periodic energy output 389 representing the noise energy for the currently processing periodic pattern. Of note, this noise energy corresponds to the signal to noise ratio of the periodic pattern (i.e., the signal to noise ratio decreases when the noise energy increases, and increases when the noise energy decreases). Non-periodic energy 389 is also provided to signal to noise ratio calculation circuit 341. Signal to noise ratio calculation circuit 341 calculates a signal to noise ratio 352 of the currently processing periodic pattern. In one particular embodiment, the calculated signal to noise ratio 352 is calculated in accordance with the following equation:

$$\text{Signal to Noise Ratio } 352 = 10\log_{10}\left[\frac{\text{Periodic Energy } 336}{\text{Non-Periodic Energy } 389}\right].$$

Signal to noise ratio 352 is provided to a summation circuit 362 where it is added to a predefined offset value programmed or hardwired as offset value 360. Offset value 360 may be determined at the factory upon manufacture, or may be developed during a training mode of operation, and is selected such that when it is added to signal to noise ratio 352 it will provide a desired adaptive threshold value 305. Offset value 360 may be multiple values that are selected between based upon a particular operation. For example, where the sync mark data is being derived from a storage medium, different values for offset value 360 may be used for different zones on the storage medium. Adaptive threshold value 305 is provided to threshold comparator circuit 397.

In parallel, equalizer output 315 is processed by a sync pattern match calculation circuit 384. Sync pattern match calculation circuit 384 compares equalizer output 315 with different successive combinations of the periodic pattern and subsequent portions of a sync mark pattern 374. Sync mark pattern 374 is received from a sync pattern 373. Sync pattern 373 may be hardwired or user programmable depending upon the particular implementation. FIG. 2c graphically shows comparisons yielding the various outputs of a sync pattern match calculation circuit 384 that were described above. The results of the comparison process (i.e., sync match 331, sync plus N match 332, sync plus 2N match 333, sync plus 3N match 334, sync plus 4N match 335) are provided to a best match identification circuit 391 that provides the lowest value of sync match 331, sync plus N match 332, sync plus 2N match 333, sync plus 3N match 334, or sync plus 4N match 335 as a best sync output 395. Best sync output 395 is provided to a threshold comparator circuit 397 where it is compared to adaptive threshold value 305. Where best sync output 395 is less than adaptive threshold value 305, a sync found 399 is asserted.

Figure 4:
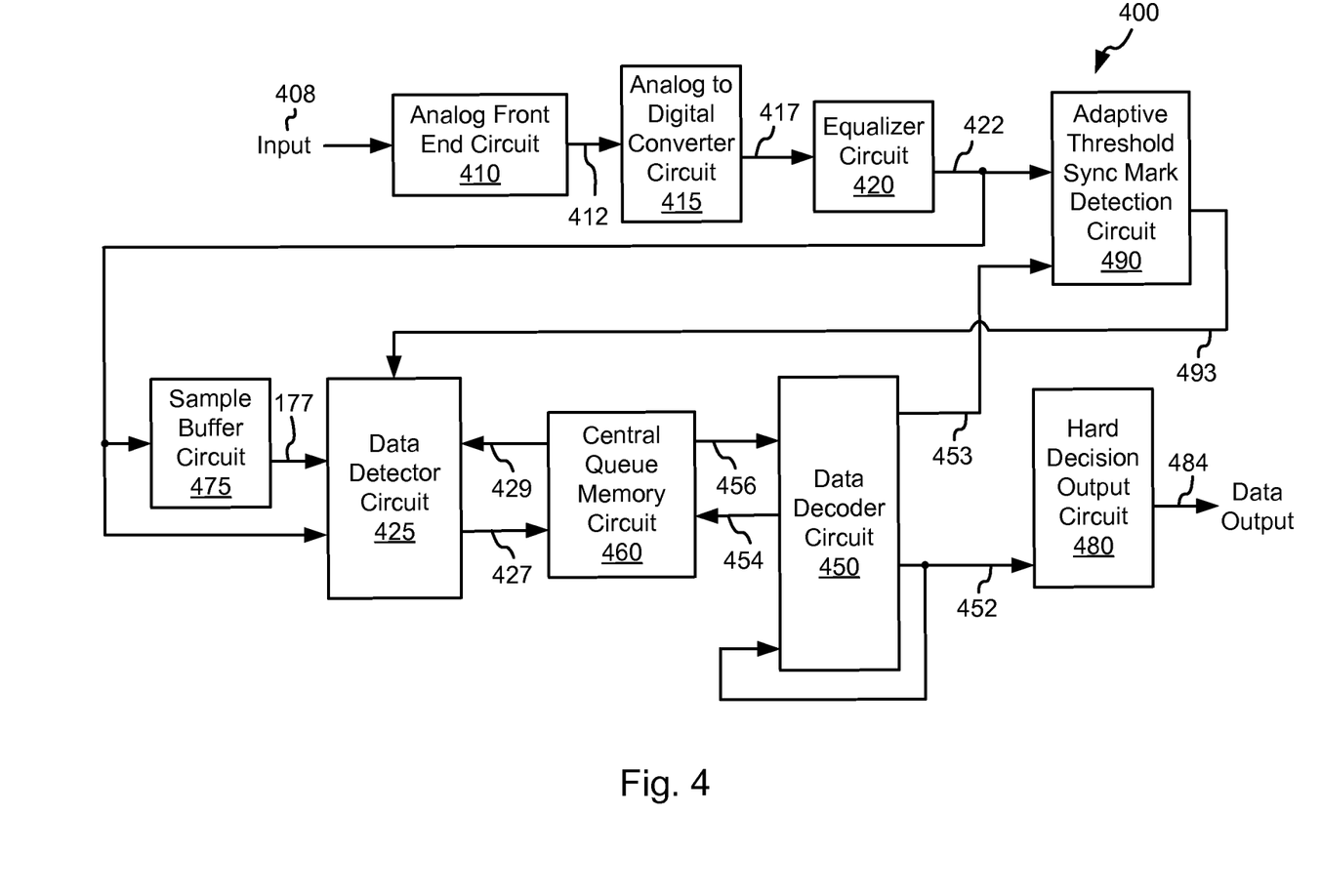
FIG. 4 depicts a data processing circuit including an adaptive threshold sync mark detection circuit in accordance with some embodiments of the present invention.

Turning to FIG. 4, a data processing circuit 400 including an adaptive threshold sync mark detection circuit is shown in accordance with some embodiments of the present invention. Data processing circuit 400 includes an analog front end circuit 410 that receives an analog input 408. Analog front end circuit 410 processes analog input 408 and provides a processed analog signal 412 to an analog to digital converter circuit 415. Analog front end circuit 410 may include, but is not limited to, an analog filter and an amplifier circuit as are known in the art. Based upon the disclosure provided herein, one of ordinary skill in the art will recognize a variety of circuitry that may be included as part of analog front end circuit 410. In some cases, analog input 408 is derived from a read/write head assembly (not shown) that is disposed in relation to a storage medium (not shown). In other cases, analog input 408 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 408 may be derived.

Analog to digital converter circuit 415 converts processed analog signal 412 into a corresponding series of digital samples 417. Analog to digital converter circuit 415 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 417 are provided to an equalizer circuit 420. Equalizer circuit 420 applies an equalization algorithm to digital samples 417 to yield an equalized output 422. In some embodiments of the present invention, equalizer circuit 420 is a digital finite impulse response filter circuit as are known in the art.

Equalized output 422 is provided to a data detector circuit 425, a sample buffer circuit 475, and an adaptive threshold sync mark detection circuit 490. Adaptive threshold sync mark detection circuit 490 may be implemented similar to that set forth above in relation to FIG. 2a-2c, or that set forth above in relation to FIG. 3. Adaptive threshold sync mark detection circuit 490 applies the aforementioned adaptive sync mark detection algorithm to identify a possible sync marks. The identified sync mark is used to generate a framing signal 493 that is used to indicate a location of the beginning of a user data set within equalized output 422.

Sample buffer circuit 475 stores equalized output 422 as buffered data 477 for use in subsequent iterations through data detector circuit 425. Data detector circuit 425 may be any data detector circuit known in the art that is capable of producing a detected output 427. As some examples, data detector circuit 425 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 425 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 427 is provided to a central queue memory circuit 460 that operates to buffer data passed between data detector circuit 425 and data decoder circuit 450. In some cases, central queue memory circuit 460 includes interleaving (i.e., data shuffling) and de-interleaving (i.e., data un-shuffling) circuitry known in the art. When data decoder circuit 450 is available, data decoder circuit 450 accesses detected output 427 from central queue memory circuit 460 as a decoder input 456. Data decoder circuit 450 applies a data decoding algorithm to decoder input 456 in an attempt to recover originally written data. The result of the data decoding algorithm is provided as a decoded output 452. Similar to detected output 427, decoded output 452 may include both hard decisions and soft decisions. For example, data decoder circuit 450 may be any data decoder circuit known in the art that is capable of applying a decoding algorithm to a received input. Data decoder circuit 450 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, decoded output 452 is stored to a memory included in a hard decision output circuit 480. In turn, hard decision output circuit 480 provides the converged decoded output 452 as a data output 484 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 452 indicates that the data is unusable as is more specifically discussed below, and data output 484 is similarly identified as unusable.

Data decoder circuit 453 additionally provides a framing signal selection signal 453 to sync mark detection and framing circuit 490 that causes sync mark detection and framing circuit 490 to provide a next best framing signal 493. Equalized output 422 is then re-processed using the new framing signal 493 indicating a different starting location of user data in equalized output 422. In some embodiments of the present invention, framing signal selection signal 453 is asserted to cause another framing signal to be provided under particular conditions. Such conditions may include, for example, a failure of data decoder circuit 450 to converge after a defined number of global iterations, and/or where a number of unsatisfied checks exceed a defined level after a defined number of global iterations have occurred in relation to the currently processing data set. Based upon the disclosure provided herein, one of ordinary skill in the art will recognize a variety of conditions upon which a next best framing signal is selected to restart the processing.

One or more iterations through the combination of data detector circuit 425 and data decoder circuit 450 may be made in an effort to converge on the originally written data set. As mentioned above, processing through both the data detector circuit and the data decoder circuit is referred to as a "global iteration". For the first global iteration, data detector circuit 425 applies the data detection algorithm to equalized output 422 without guidance from a decoded output. For subsequent global iterations, data detector circuit 425 applies the data detection algorithm to buffered data 477 as guided by decoded output 452. To facilitate this guidance, decoded output 452 is stored to central queue memory circuit 460 as a decoder output 454, and is provided from central queue memory circuit 460 as a detector input 429 when equalized output 422 is being re-processed through data detector circuit 425.

During each global iteration it is possible for data decoder circuit 450 to make one or more local iterations including application of the data decoding algorithm to decoder input 456. For the first local iteration, data decoder circuit 450 applies the data decoder algorithm without guidance from decoded output 452. For subsequent local iterations, data decoder circuit 450 applies the data decoding algorithm to decoder input 456 as guided by a previous decoded output 452. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 450 exceeds that allowed, but it is determined that at least one additional global iteration during standard processing of the data set is allowed, decoded output 452 is provided back to central queue memory circuit 460 as decoded output 454. Decoded output 454 is maintained in central queue memory circuit 460 until data detector circuit 425 becomes available to perform additional processing.

In contrast, where the number of local iterations through data decoder circuit 450 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

Figure 5:
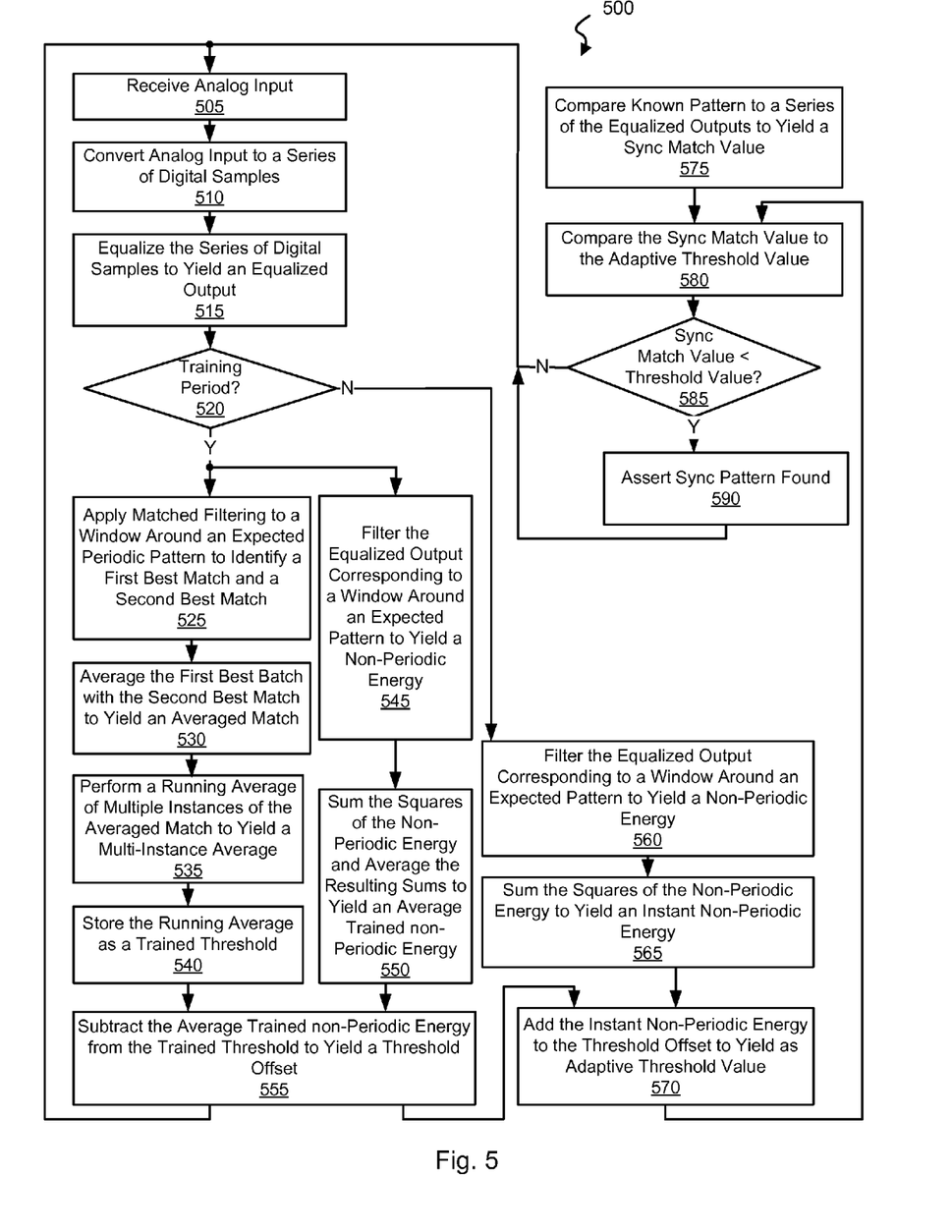
FIG. 5 is a flow diagram showing a method in accordance with one or more embodiments of the present invention for adaptive threshold sync mark detection.

Turning to Fig. a flow diagram 500 show a method in accordance with one or more embodiments of the present invention for adaptive threshold sync mark detection. Following flow diagram 500, an analog input is received (block 505). The analog input may be derived from, for example, a storage medium or a data transmission channel. Based upon the disclosure provided herein, one of ordinary skill in the art will recognize a variety of sources of the analog input. The analog input is converted to a series of digital samples (block 510). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 515). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

It is determined whether a training period is underway (block 520). A training period may be selected for example, at the start of operation, at manufacture, and/or at a time when the device does not appear to be functioning properly. Based upon the disclosure provided herein, one of ordinary skill in the art will recognize a variety of instances when a training period may be selected. During the training period, several hundred or thousands of instances of a periodic pattern may be processed to yield a default offset value. While not shown in detail in FIG. 5, the training process (i.e., repeatedly processing periodic data) may be performed under different conditions to yield different values of the default offset value corresponding to the different conditions. For example, where the sync mark data is being derived from a storage medium, different values for the default offset value may be used for different zones on the storage medium. The particular value of offset value may then be selected depending upon the condition during standard processing.

Where a training period is underway (block 520), matched filtering is applied to samples of the equalized output within a window during which the periodic pattern is expected to yield a first best match to the known periodic pattern and a second best match to the known periodic pattern (block 525). The value of the first best match is averaged with the value of the second best match to yield an averaged match (block 530), and a running average of the averaged match with instances of the averaged match generated for previous instances of the periodic pattern is performed to yield a Multi-instance average (block 535). The multi-instance average is stored as a trained threshold (block 540).

In parallel, samples of the equalized output corresponding to a window during which the periodic pattern is expected is filtered to yield a non-periodic energy (block 545). A sum of the squares of the values of non-periodic energy corresponding to the respective samples of the equalized output is calculated, and an average of the respective sums of squares is calculated to yield an average trained non-periodic energy across a number of instances of the periodic pattern (block 550). The average trained non-periodic energy value is then subtracted from the trained threshold to yield a threshold offset (block 555). As previously mentioned, the threshold offset is calculated by averaging a number of instances of the averaged match and the sums of squares generated by processing multiple instances of the periodic data.

Where, on the other hand, a standard operation is ongoing (i.e., a training period is not selected) (block 520), samples of the equalized output corresponding to a window during which the periodic pattern is expected is filtered to yield a non-periodic energy (block 560), and a sum of the squares of the values of non-periodic energy corresponding to the respective samples of the equalized output is calculated to yield an instant non-periodic energy (i.e., noise included with the currently processing periodic pattern) (block 565). This instant non-periodic energy is added to the threshold offset from block 555 to yield an adaptive threshold value (block 570).

In parallel, a known sync mark pattern is compared to a series of samples from the equalized output to yield a sync match value (block 575). The sync match value is compared with the adaptive threshold value (block 580). It is then determined whether the sync match value is less than the adaptive threshold value (block 585). Where the sync match value is less than the adaptive threshold value (block 585), a sync found is asserted (block 590).

Figure 6:
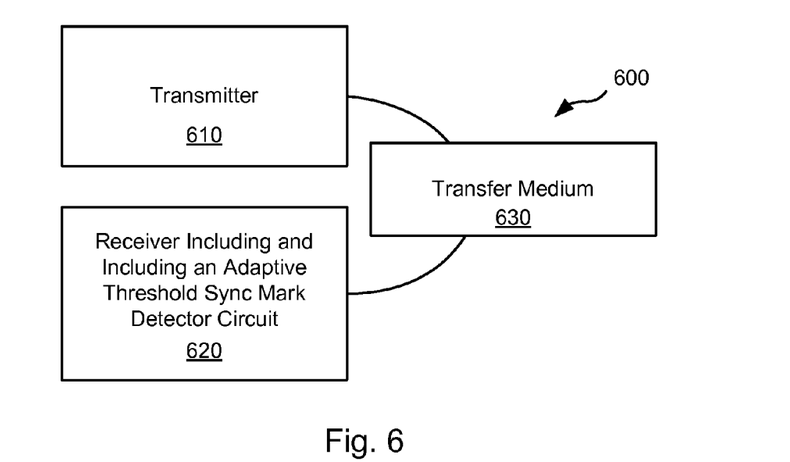
FIG. 6 depicts a communication system including an adaptive threshold sync mark detector circuit in accordance with different embodiments of the present invention.

Turning to FIG. 6, a communication system 600 including a receiver 620 with an adaptive threshold sync mark detector circuit is shown in accordance with different embodiments of the present invention. Communication system 600 includes a transmitter 610 that is operable to transmit encoded information via a transfer medium 630 as is known in the art. The encoded data is received from transfer medium 630 by receiver 620. The adaptive threshold sync mark detector circuit included in receiver 620 may be similar to that discussed above in relation to FIGS. 2a-2c, and/or FIG. 3, and/or may operate in accordance with the method discussed above in relation to FIG. 5. In some cases, the adaptive threshold sync mark detector circuit is incorporated in a data processing circuit that itself is included in receiver 620. In such cases, the data processing circuit may be similar to that discussed above in relation to FIG. 4.

In operation, a series of data samples are derived by receiver 620 from information received via transfer medium 630. During a training period, a default threshold is calculated. This may be done, for example, by averaging the best match level of the series of data samples with the second best match level. In addition, an average energy resulting from other than a periodic pattern (e.g., a preamble patter preceding a sync mark pattern) is repeatedly calculated during the test period to yield an average non-periodic energy. This average non-periodic energy is subtracted from the default threshold to yield a offset value. Then, during normal operation, the best match of the series of data samples to the sync mark pattern is identified and the corresponding value calculated. In addition, the energy resulting from other than the periodic pattern is calculated to yield an instant non-periodic energy. This instant non-periodic energy is added to the offset value to yield an adapted threshold. The value of the best match of the sync mark pattern is compared with the adapted threshold. Where the value is less than the adapted threshold, a sync mark is identified as found. Otherwise, a sync mark is not found.

Figure 7:
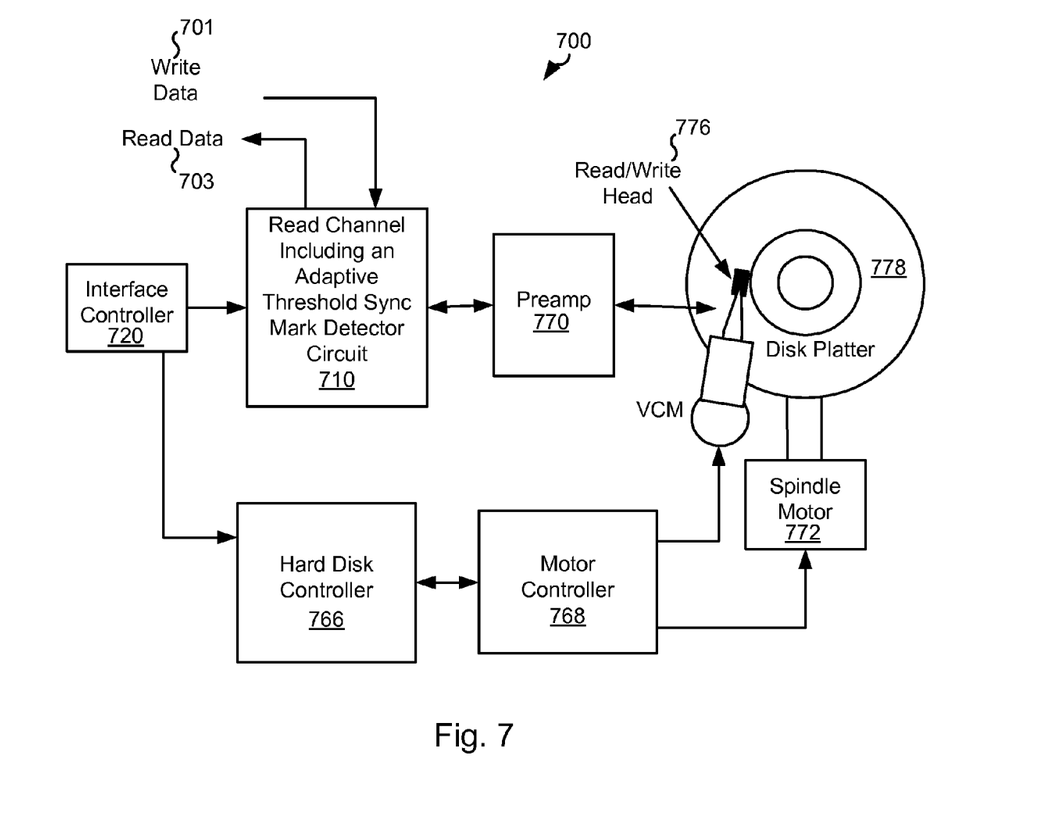
FIG. 7 shows a storage system including an adaptive threshold sync mark detector circuit in accordance with some embodiments of the present invention.

Turning to FIG. 7, a storage system 700 including a read channel circuit 710 with an adaptive threshold sync mark detector circuit is shown in accordance with various embodiments of the present invention. Storage system 700 may be, for example, a hard disk drive. Storage system 700 also includes a preamplifier 770, an interface controller 720, a hard disk controller 766, a motor controller 768, a spindle motor 772, a disk platter 778, and a read/write head 776. Interface controller 720 controls addressing and timing of data to/from disk platter 778. The data on disk platter 778 consists of groups of magnetic signals that may be detected by read/write head assembly 776 when the assembly is properly positioned over disk platter 778. In one embodiment, disk platter 778 includes magnetic signals recorded in accordance with either a longitudinal or a perpendicular recording scheme.

In a typical read operation, read/write head assembly 776 is accurately positioned by motor controller 768 over a desired data track on disk platter 778. Motor controller 768 both positions read/write head assembly 776 in relation to disk platter 778 and drives spindle motor 772 by moving read/write head assembly to the proper data track on disk platter 778 under the direction of hard disk controller 766. Spindle motor 772 spins disk platter 778 at a determined spin rate (RPMs). Once read/write head assembly 778 is positioned adjacent the proper data track, magnetic signals representing data on disk platter 778 are sensed by read/write head assembly 776 as disk platter 778 is rotated by spindle motor 772. The sensed magnetic signals are provided as a continuous, minute analog signal representative of the magnetic data on disk platter 778. This minute analog signal is transferred from read/write head assembly 776 to read channel module 764 via preamplifier 770. Preamplifier 770 is operable to amplify the minute analog signals accessed from disk platter 778. In turn, read channel circuit 710 decodes and digitizes the received analog signal to recreate the information originally written to disk platter 778. This data is provided as read data 703 to a receiving circuit. As part of decoding the received information, read channel circuit 710 performs a sync mark detection process. Such a sync mark detection process may be performed using the adaptive threshold sync mark detector circuit. The adaptive threshold sync mark detector circuit may be similar to that discussed above in relation to FIGS. 2a-2c, and/or FIG. 3, and/or may operate in accordance with the method discussed above in relation to FIG. 5. In some cases, the adaptive threshold sync mark detector circuit is incorporated in a data processing circuit that itself is included in read channel 710. In such cases, the data processing circuit may be similar to that discussed above in relation to FIG. 4.

In operation, a series of data samples are derived by read channel 710 from information received from disk platter 778. During a training period, a default threshold is calculated. This may be done, for example, by averaging the best match level of the series of data samples with the second best match level. In addition, an average energy resulting from other than a periodic pattern (e.g., a preamble patter preceding a sync mark pattern) is repeatedly calculated during the test period to yield an average non-periodic energy. This average non-periodic energy is subtracted from the default threshold to yield a offset value. Then, during normal operation, the best match of the series of data samples to the sync mark pattern is identified and the corresponding value calculated. In addition, the energy resulting from other than the periodic pattern is calculated to yield an instant non-periodic energy. This instant non-periodic energy is added to the offset value to yield an adapted threshold. The value of the best match of the sync mark pattern is compared with the adapted threshold. Where the value is less than the adapted threshold, a sync mark is identified as found. Otherwise, a sync mark is not found.

It should be noted that storage system 700 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 710 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 700 may be modified to include solid state memory that is used to store data in addition to the storage offered by disk platter 778. This solid state memory may be used in parallel to disk platter 778 to provide additional storage. In such a case, the solid state memory receives and provides information directly to read channel circuit 710. Alternatively, the solid state memory may be used as a cache where it offers faster access time than that offered by disk platted 778. In such a case, the solid state memory may be disposed between interface controller 720 and read channel circuit 710 where it operates as a pass through to disk platter 778 when requested data is not available in the solid state memory or when the solid state memory does not have sufficient storage to hold a newly written data set. Based upon the disclosure provided herein, one of ordinary skill in the art will recognize a variety of storage systems including both disk platter 778 and a solid state memory.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   a pattern detector circuit operable to generate a pattern value based upon a comparison of a defined pattern to a first portion of a received input; and
   a comparator circuit operable to compare the pattern value to an adapted threshold, and to selectively assert a pattern found signal based at least in part on the comparison of the pattern value and the adapted threshold, wherein the adapted threshold is adjusted based at least in part on a noise component of a second portion of the received input.

2. The data processing system of claim 1, wherein the first portion of the received input is exclusive of the second portion of the received input.

3. The data processing system of claim 1, wherein the first portion of the received input includes a sync mark, and wherein the second portion of the received input includes a periodic pattern.

4. The data processing system of claim 3, wherein the periodic pattern is a 2T pattern.

5. The data processing system of claim 3, wherein the periodic pattern is a preamble pattern.

6. The data processing system of claim 1, wherein the data processing system is implemented as part of a storage device, and wherein the received input is derived from a storage medium included in the storage device.

7. The data processing system of claim 1, wherein the data processing system is implemented as part of a communication device, and wherein the received input is derived from a transfer medium.

8. The data processing system of claim 1, wherein the data processing system further comprises:
   a threshold adaptation circuit operable to adjust the adapted threshold based at least in part on the second portion of the received input.

9. The data processing system of claim 8, wherein the threshold adaptation circuit is operable to calculate a noise component of the second portion of the received input, and to add the noise component to an offset value to yield the adapted threshold.

10. The data processing system of claim 8, wherein the threshold adaptation circuit comprises:
    a noise calculation circuit operable to calculate a noise component of the second portion of the received input; and
    a summation circuit operable to add the noise component to an offset value to yield the adapted threshold.

11. The data processing system of claim 10, wherein the threshold adaptation circuit further comprises:
    a pattern matching circuit operable to compare a defined periodic pattern with the second portion of the received input to yield a first best match value and a second best match value;
    an averaging circuit operable to average the first best match value and the second best match value to yield an interim value, to calculate a first running average of multiple interim values generated from multiple instances of the second portion of the received input, and to provide the first running average as a trained output;
    a noise averaging circuit operable to calculate a second running average of the noise components generated from multiple instances of the second portion of the received input, and to provide the second running average as an average noise component; and
    a summation circuit operable to subtract the average noise component from the trained output to yield the offset value.

12. The data processing system of claim 10, wherein the noise calculation circuit comprises:
    a finite impulse response filter operable to filter the second portion of the received input to yield a filtered output; and
    a sum of squares circuit operable to sum the squares of elements of the filtered output to yield the noise component.

13. The data processing system of claim 1, wherein the system is implemented as part of an integrated circuit.

14. A method for detecting a data pattern, the method comprising:
    receiving an input data set;
    comparing the input data set with a defined pattern to yield a pattern value using a pattern comparison circuit;
    comparing the pattern value to an adapted threshold;
    selectively asserting a pattern found signal based at least in part on the comparison of the pattern value and the adapted threshold, wherein the adapted threshold is adjusted based at least in part on a noise component of a second portion of the received input.

15. The method of claim 14, the method further comprising:
- calculating a noise component of the second portion of the received input; and
- adding the noise component and an offset value to yield the adapted threshold.

16. The method of claim 15, the method further comprising:
- comparing a defined periodic pattern with the second portion of the received input to yield a first best match value and a second best match value;
- averaging the first best match value and the second best match value to yield an interim value,
- calculating a first running average of multiple interim values generated from multiple instances of the second portion of the received input, wherein the first running average is provided as a trained output;
- calculating a second running average of the noise components generated from multiple instances of the second portion of the received input, wherein the second running average is provided as an average noise component; and
- subtracting the average noise component from the trained output to yield the offset value.

17. The method of claim 15, wherein calculating a noise component comprises:
- applying an finite impulse response filtering to the second portion of the received input to yield a filtered output; and
- summing the squares of elements of the filtered output to yield the noise component.

18. The method of claim 14, wherein the first portion of the received input includes a sync mark, and wherein the second portion of the received input includes a periodic pattern.

19. The method of claim 18, wherein the periodic pattern is a 2T pattern.

20. A storage device, the storage device comprising:
- a storage medium;
- a head assembly disposed in relation to the storage medium and operable to provide a sensed signal corresponding to information on the storage medium;
- a read channel circuit including:
- an analog front end circuit operable to provide an analog signal corresponding to the sensed signal;
- an analog to digital converter circuit operable to sample the analog signal to yield a series of digital samples;
- an equalizer circuit operable to equalize the digital samples to yield a sample set, wherein the sample set includes at least a first portion and a second portion;
- a data processing circuit, wherein the data processing circuit includes:
  - a pattern detector circuit operable to generate a pattern value based upon a comparison of a defined pattern to the first portion; and
  - a comparator circuit operable to compare the pattern value to an adapted threshold, and to selectively assert a pattern found signal based at least in part on the comparison of the pattern value and the adapted threshold, wherein the adapted threshold is adjusted based at least in part on a noise component of the second portion.

* * * * *